Feb. 17, 1970 R. D. DURAND ET AL 3,495,911
EXTENDED RANGE INTERFEROMETER
Original Filed July 2, 1965 2 Sheets-Sheet 1

INVENTORS
ROBERT D. DURAND
THOMAS S. HAHS

BY *Earl C. Hanush*

ATTORNEY

United States Patent Office 3,495,911
Patented Feb. 17, 1970

---

3,495,911
EXTENDED RANGE INTERFEROMETER
Robert D. Durand, Woodstock, and Thomas S. Hahs, Wappingers Falls, N.Y., assignors to International Business Machines Corporation, Armonk, N.Y., a corporation of New York
Continuation of application Ser. No. 469,111, July 2, 1965. This application Apr. 18, 1969, Ser. No. 817,629
Int. Cl. G01b 9/02
U.S. Cl. 356—106                                  8 Claims

ABSTRACT OF THE DISCLOSURE

An interferometer for measuring extended distance variations incorporating a multimode light source (such as a laser) including at least three light paths, the standard measuring path and at least two reference paths. Means are also included to insure that the two interferomic fringes produced are phase coherent and the path difference at the photo-detector is such that when one fringe pattern is of highest intensity the other is at minimum, the combination of the two fringe patterns reinforcing each other and producing a detectable fringe pattern over an extended coherence range.

---

This invention relates to interferometers having extended operating ranges and is a continuation of application Ser. No. 469,111 now abandoned. More particularly, this invention relates to interferometers having an extended operating range while utilizing a multiple frequency or multi-mode light source. Still more particularly, this invention relates to optical devices having an extended range over which interferometric fringes can be counted without ambiguity and without requiring a single mode light source.

In general, multi-mode light sources such as lasers are easier and cheaper to fabricate, are more powerful and operate without elaborate temperature control as is required for single mode sources. However, multi-mode sources suffer the disadvantage for measuring distances with fringe counting interferometers in that there is a periodic minima in contrast or discernability of the fringes as the length increases over which the fringes are counted. If it were not for this restriction, the range of countable interferometric fringes could be significantly extended.

Accordingly, the present invention effectively bridges the minima restriction in fringe contrast by advantageously combining two interferometer type light paths in such a way that the distance being measured is one arm of both interferometric light paths. At the same time, the reference arms which are optical paths of fixed length are isolated from each other. Basically, the present invention employs at least two beam splitting devices and reflective surfaces to create different reference light paths. The configuration is arranged to energize one or more detectors so that when the interferometric fringes associated with one reference path is at a minimum level of discernability, the fringes associated with the other reference path are at a maximum discernability. Thus the fringes are continuously countable at a detector for markedly greater ranges of measurement than has been possible heretofore. Phase control between the reference paths can be easily realized either mechanically or by electronic means. The present invention is relatively simple to manufacture and can be fabricated into a rugged configuration.

It is an object of this invention to extend the usable measurement range of interferometers.

It is another object of this invention to permit extension of the usable range of interferometers using multi-mode light sources.

Yet another object of this invention is to extend the measuring range of interferometers employing multi-mode lasers for light sources.

Still another object of this invention is to provide interferometers having plural reference paths.

Figure 1:
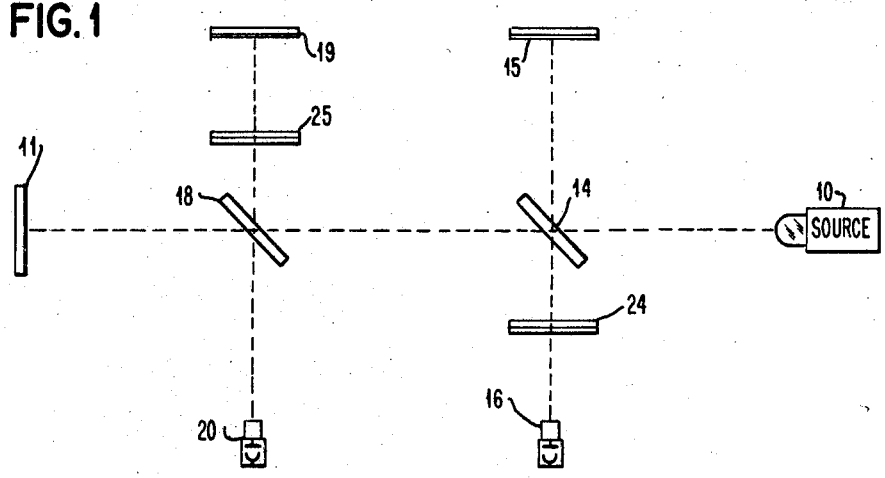
Figure 2:
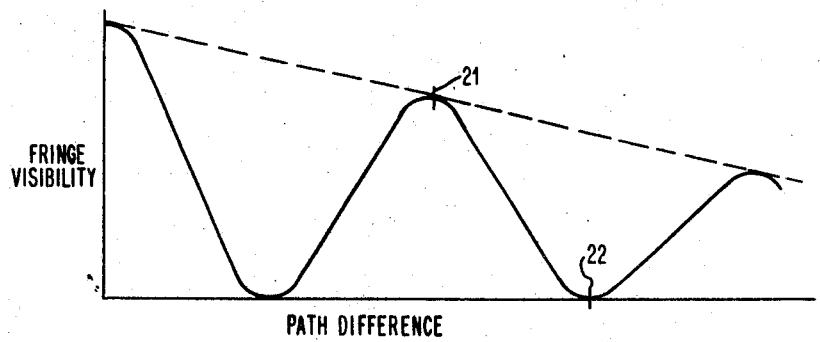
Figure 3:
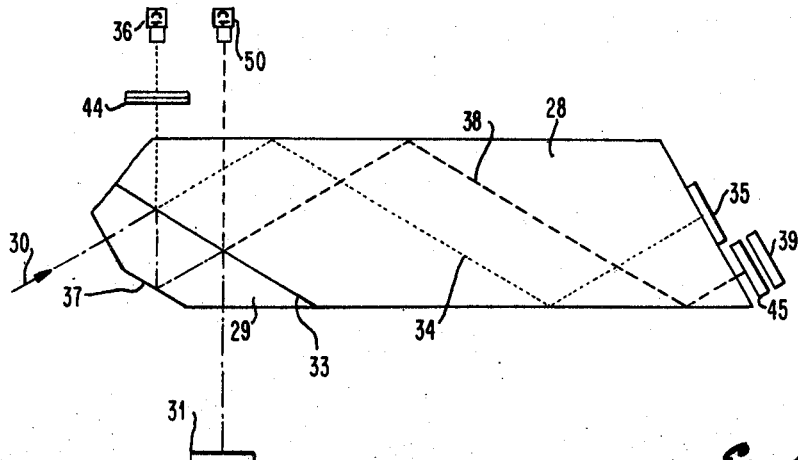
Figure 4:
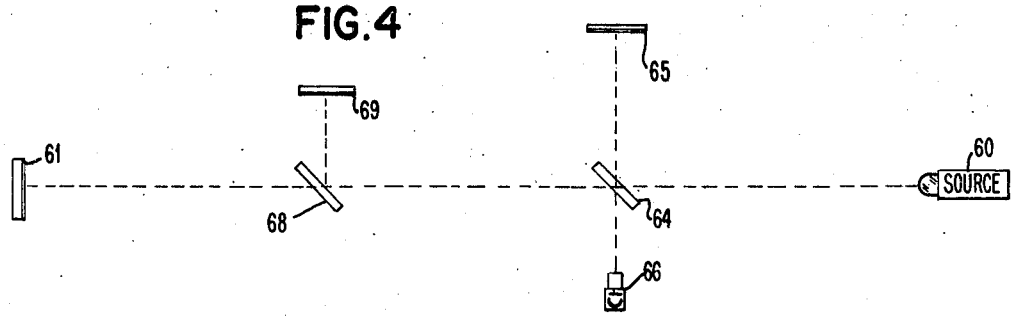
Figure 5:
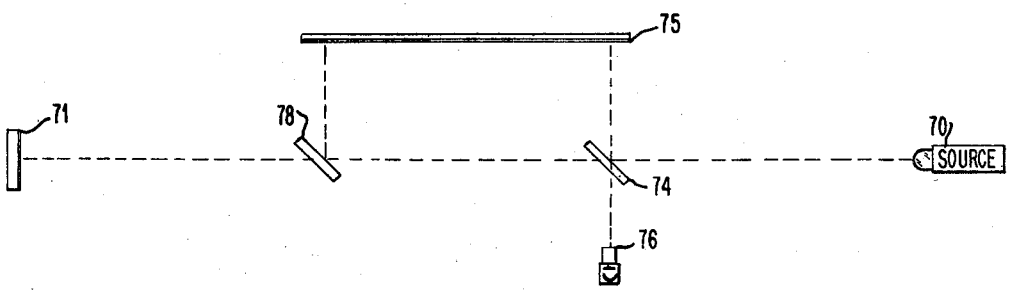
Figure 6:
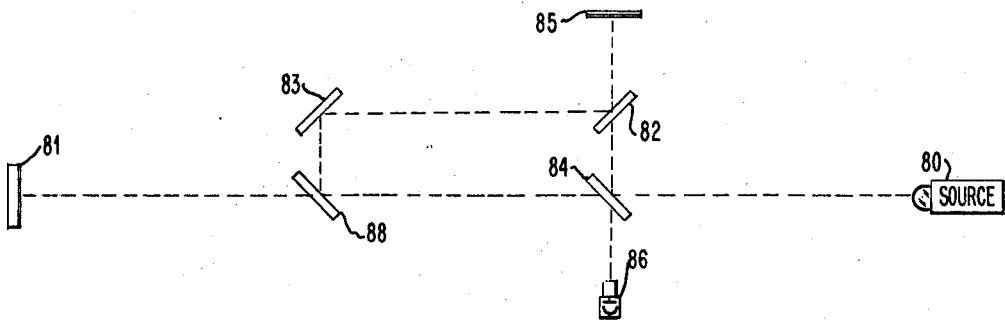
Figure 7:
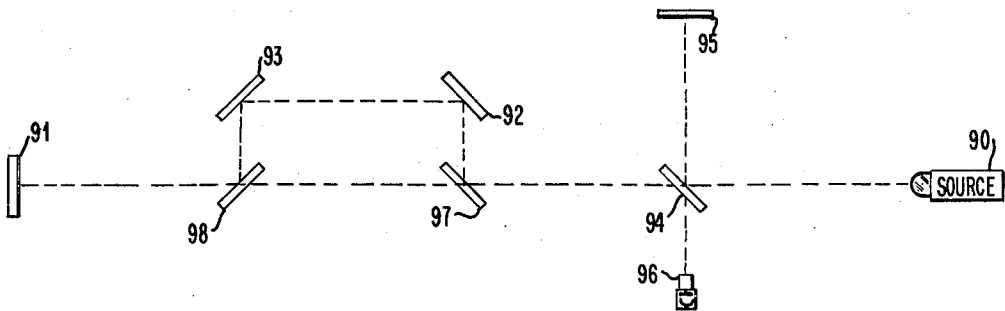

The foregoing and other objects, features and advantages of the present invention will be apparent from the following more particular description of preferred embodiments of the invention as illustrated in the accompanying drawings in which:

FIGURE 1 is a simple representation of one embodiment in accordance with this invention, FIGURE 2 is a graph of the characteristics of a multi-mode light source, used in conjunction with a conventional interferometer, FIGURE 3 is an illustration of a rugged configuration utilizing the fundamental principles of FIGURE 1, FIGURE 4 is a representation of another embodiment in accordance with this invention utilizing a single detector, FIGURE 5 is another representation of this invention similar to the FIGURE 4 illustration, FIGURE 6 is still another single detector configuration possible with the present invention, and FIGURE 7 is an illustration of an embodiment somewhat similar to FIGURE 6.

Lasers having nearly monochromatic light and radiating with high intensity into a narrow solid angle so as to form a bright source potentially make possible long range interferometry previously impossible. Conventional interferometers measure the difference in the length of two optical paths. Although the paths may be long, the difference in path lengths has been limited as is imposed by the "coherence length" of the light used. Natural sources of light such as ionized gas emit spectral lines which are not narrow enough measured by the spread of frequencies each line includes to be considered truly monochromatic. Thus a loss of fringe pattern visibility is experienced as the path length difference is increased, this resulting from the undesired interference of light frequencies from the source. A typical plot of the interferometric fringe visibility as path length difference is increased as shown in FIG. 2. The solid line in FIG. 2 illustrates the visibility determination if a plural mode source is used whereas the dotted line shows the loss of visibility which would result from the practical width of a single mode source. The slope of the dotted line will be a function of the bandwidth of the source. Thus it can be seen that the useful range drops off rapidly for a multi-mode source even though a considerable portion of usable maximums is still theoretically available. Since loss of any fringe count is generally intolerable in interferometers, the range is restricted by the first minimum.

If the foregoing variation of contrast or visibility of the fringes is neglected for multi-mode operation, the coherence length of a laser such as a helium-neon gas laser is considerably longer than previously was available. Thus the potential for significant extension of measuring range for interferometers exists. Lasers which operate in a single mode and therefore do not have the variations in fringe visibility can be built but they are less powerful and far more expensive than multi-mode lasers.

FIGURE 1 illustrates an embodiment of this invention which permits continuous fringe counting over wide displacements in path length difference. Source 10 can be a multi-mode laser or any device which has a fringe visibility pattern such as is shown in FIGURE 2. As will be discussed hereinafter, the FIG. 1 device includes essentially two interferometer light paths with source 10 and mirror 11 in common. A beam splitter 14 permits part of the light to pass therethrough and part to be deflected towards mirror 15. Detector 16 receives the light reflected back through splitter 14 and, at the same time, receives the reflected light from mirror 11 which is deflected by splitter 14 into detector 16. Thus the detector 16 has the potential to count interferometric fringes and measure the displacement of mirror 11.

To compensate for loss of fringe visibility, the FIG. 1 apparatus includes a second beam splitter 18 which also passes some light from source 10 to mirror 11 and deflects some of that light into mirror 19 from which it is re-directed back through splitter 18 into detector 20. Splitter 18 also deflects the light reflected by mirror 11 into detector 20 thus permitting fringe counting at detector 20. Accordingly, it can be seen that two reference paths are provided and, by properly positioning the paths associated with detectors 16 and 20, the fringe visibility at one detector can be substantially at a maximum while the fringe visibility at the other detector can be at a minimum. As shown in FIG. 2, this is illustrated by way of example with detector 16 counting fringes at maximum point 21 while detector 20 is at a minimum fringe visibility point 22. As a result, there will be countable fringes at either detector 21 or detector 22 for the entire possible path difference range for source 10.

To isolate detector 16 from the reference light path for detector 20 and vice versa, polarizers 24 and 25 can be included as shown. These polarizers are of opposite optical orientation so that light for detector 16 will be polarized in one direction while light illuminating mirror 19 will be polarized orthogonally with respect to the detector 16 light. Therefore light reflected by mirror 19 which would be deflected once by splitter 18 and again by splitter 14, would be blocked from appearing at detector 16 by polarizer 24 since this light would have had to pass through the polarizer 25. As a result, there can be no interference between the reference paths for detectors 16 and 20. As the path difference changes from mirror 11 being moved, detectors 16 and 20 will have separate countable fringes thereat. By maintaining the fringes at these detectors in phase, the combination of detector 16 and 20 outputs permits continuous countability of fringes despite the periodic minima of visibility associated with source 10. Phase correction or adjustment can be accomplished easily by a mechanical positioning adjustment of mirrors 15 or 19 by electronic means associated with detectors 16 or 20 or by any combination of these. If electronic phase control that is not invariant with frequency is utilized, then the rate of speed of displacement for mirror 11 must be controlled. However, mechanical phase adjustment is relatively insensitive to the rate of displacement of mirror 11.

FIGURE 3 illustrates a potential implementation of the present invention in accordance with the teachings of FIG. 1 in a relatively rigid and rugged structure. Block 28 of translucent material such as glass or clear plastic has associated with it a plate 29 with surface 33 therebetween providing beam splitting. That is, surface 33 is the equivalent of beam splitters 14 and 18 of FIG. 1 in providing two separate beam splitting functions which will be more apparent from the following description. Light from source 30 is split at surface 33 into a reference path 34 and in a downward path to surface 37 from which it is reflected back towards surface 33. At this point, the beam is again split, this time between reference path 38 and movable mirror 31. The light from mirror 31 is reflected back and follows appropriate paths to appear at detectors 36 and 50.

Light which travels down reference path 34 is reflected by fixed mirror 35 to ultimately energize detector 36. At the same time, light passing down reference path 38 is reflected by mirror 39 to ultimately appear at detector 50. Polarizers 44 and 45 provide the same isolation function as polarizers 24 and 25 in FIG. 1. Mirror 39 will be immersed in index-matching oil with it and polarizer 45 being held by pressure against block 28. By varying the pressure, the space between mirror 39 and block 28 can be varied by providing a simple path length adjustment of one-half wavelength for phase matching.

The device of FIG. 3 has the advantage that the reference paths 34 and 38 are entirely contained in block 28. If block 28 were of glass having an index of refraction of 1.5, block 28 would be about three inches in length. Since mirror 31 is movable and is the common leg for both detectors 36 and 50 which have fixed reference path lengths, the change in path difference for both detectors is equal and fringes will be observed at the same rate.

FIGURES 4–7 illustrate embodiments of the present invnetion which only require one common detector thus not requiring the inclusion of any polarizers. In FIG. 4, the interferometer reference light paths provided by splitters 64 and 68 and mirrors 65 and 69 are somewhat similar to the two reference paths discussed for FIG. 1. However, the reference path from mirror 69 includes splitters 68 and 64 for energizing detector 66 concurrently with the path from mirror 65. This permits the automatic optical combination of the two possible interferometer fringe appearances without the necessity for additional means for electrically combining the outputs of two or more detectors. However, the physical spacing of the mirrors and splitters must be maintained so that the fringes associated with the reference paths are in phase at detector 66, this also being true for FIGURES 5, 6 and 7. That is, the FIG. 4 arrangement requires that twice the distance from splitter 64 to mirror 65 must be an integral number of wavelengths different from twice the light plate distance between splitter 64 and mirror 69. By maintaining the difference between the reference paths to and from splitter 64 equal to the length of the repeating pattern of fringe visibility, low fringe visibility from one reference path will correspond to high visibility for the other. The result will be continuously visible fringes.

The FIG. 5 arrangement permits accommodation of some mirror motion in the reference paths in addition to motion of mirror 71. Thus mirror 75 is common to both reference paths so that motion of mirror 75 will cause like changes in reference path lengths and not adversely effect the two signals at detector 76. Phase control would be realized by relative positioning of splitters 74 and 78.

Angular motion of reference mirrors with respect to each other can be overcome by the configuration of FIG. 6. In this system, one reference path is provided by splitter 84 and mirror 85 directly into detector 86 whereas the other reference path is provided by splitter 88, mirror 83 and splitter 82 directing light onto reference mirror 85. Thus the two reference beams are recombined to be colinear between reference mirror 85 and detector 86. The FIGURE 7 arrangement is somewhat similar to FIG. 6 except the reference paths are colinear only between splitter 94 and detector 95. It should be noted that the FIGS. 6 and 7 configurations each have three reference paths which presents no phase control problems since two such paths are of identical length.

It is to be appreciated that the present invention is readily adaptable to include many more reference paths than shown. For instance, the FIG. 4 device could include a third splitter between splitter 68 and mirror 61 with an additional reference mirror reflecting back into the added splitter. This could be arranged to cause a third reference path for energizing detector 66. It should also be noted that, for most cases, a mirror described herein as a reference mirror could be the movable mirror and the mirror described as movable being a reference minor. That is, mirror 65 or 69 in FIG. 4 could be movable while mirror 61 is a relatively fixed reference mirror.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An extended range interferometer comprising:
   a source of multi-mode light;
   a reflecting surface arranged for illumination by the light from said source;
   at least two beam splitting means each dividing the light from said source into first and second paths, said second paths reflected by said reflecting surface;
   detector means each arranged for receiving one of said second paths of light from said reflecting surface;
   means for redirecting each of said first paths of multi-mode light to one of said detector means, each of said first and second light paths interfering at one of said detectors and producing interferometric fringes;
   said means for redirecting and said splitting means being located so that light split by one of said beam splitting means will produce at one of said detectors substantially maximum discernible interferometric fringes when light split by another of said beam splitting means will produce at another of said detectors minimum discernible fringes.

2. An extended range interferometer comprising:
   a source of multi-mode light;
   a reflecting surface arranged for illumination by the light from said source;
   at least two beam splitting means each dividing the light from said source into first and second path, said second paths reflected by said reflecting surface;
   detector means each arranged for receiving one of said second paths of light from said reflecting surface;
   means for redirecting each of said first paths of multi-mode light to one of said detector means, each of said first and second light paths interfering at one of said detectors and producing interferometric fringes;
   one of said beam splitting means located to cause maximum discernibility of the interferometric fringes produced by the light it splits when another of said beam splitting means causes minimum discernibility of the interferometric fringes produced by the light it splits.

3. An extended range interferometer comprising:
   a source of multi-mode light;
   a reflecting surface arranged for illumination by the light from said source;
   at least two beam splitting means each dividing the light from said source into first and second paths, said second paths reflected by said reflecting surface;
   detector means each arranged for receiving one of said second paths of light from said reflecting means;
   means for redirecting each of said first paths of multi-mode light to one of said detector means, each of said first and second light paths interfering at one of said detectors and producing interferometric fringes;
   said means for redirecting located for maximum discernibility of the interferometric fringes at one of said detectors when the interferometric fringes at another of said detectors is producing minimum discernibility.

4. An extended range interferometer comprising:
   a source of multi-mode light;
   a first reflective surface arranged for illumination by the light from said source;
   first and second beam splitting means interposed in the light path between said source and said surface;
   second and third reflective surfaces arranged for receiving the light directed from said source by said first and second splitting means respectively;
   said reflective surfaces redirecting the light received from each of said splitting means back to the same splitting means;
   first and second detectors arranged for receiving the redirected multi-mode light from said second and third surfaces respectively and said first and second splitting means redirecting the multi-mode light received from said first surface into said first and second detectors, respectively, for causing interferometric fringes to be present at said detectors; and
   means for adjusting the path differences causing the interferometric fringes so as to cause substantially maximum discernible interferometric fringes at one of said detectors when the interferometric fringes at said other detector are at a minimal discernibility.

5. Apparatus as defined in claim 4 wherein the means for adjusting the path difference include:
   first and second polarizers having orthogonal optic orientation with respect to one another interposed between said reflective surfaces and said detectors.

6. An extended range interferometer comprising:
   a source of multi-mode light;
   a first reflective surface arranged for illumination by light from said source and for redirecting said light back towards said source;
   a first beam splitting means for initially receiving light from said source;
   a second beam splitting means for receiving light passed by said first splitting means, said first and second splitting means located in the light path between said source and said first surface;
   a second reflective surface for receiving light deflected by said first and second splitting means, and for redirecting the light so received back towards the same splitting means from which it was deflected; and
   a detector arranged for receiving the multi-mode light redirected by said reflective surfaces, said surfaces and said splitting means being located so that the light paths created by said first splitting means will produce substantially maximum discernible interferometric fringes when the light paths created by said second splitting means will produce minimum discernible fringes at said detector.

7. Apparatus in accordance with claim 6 which includes:
   a third reflective surface; and
   a third beam splitting means arranged in the light path between said first beam splitting means and said second reflective surface;
   said third surface being located for receiving light deflected by said second beam splitting means and for redirecting the light so received onto said third beam splitting means, said third splitting means deflecting the light from said third surface into the light path towards said second surface.

8. Apparatus in accordance with claim 6 which includes:
   third and fourth reflective surfaces; and
   a third beam splitting means interposed in the light path between said first and second beam splitting means for deflecting light received from said first splitting means onto said third surface;
   said third surface redirecting light received from said third splitting means onto said fourth surface;
   said fourth surface redirecting the light from said third surface onto said second splitting means;
   said second splitting means being arranged for deflecting the light from said fourth surface into the light path between said source and said first surface.

References Cited

UNITED STATES PATENTS 3,127,465 3/1964 Stephens.
3,360,987 1/1968 Flower et al.

RONALD L. WIBERT, Primary Examiner

T. MAJOR, Assistant Examiner